July 29, 1952 J. MARCO 2,605,086
UNIT EQUIPMENT FOR SUCCESSIVELY TREATING AND
REFINING OF FOOD AND ANALOGOUS MATERIALS
Filed Sept. 13, 1946 2 SHEETS—SHEET 1
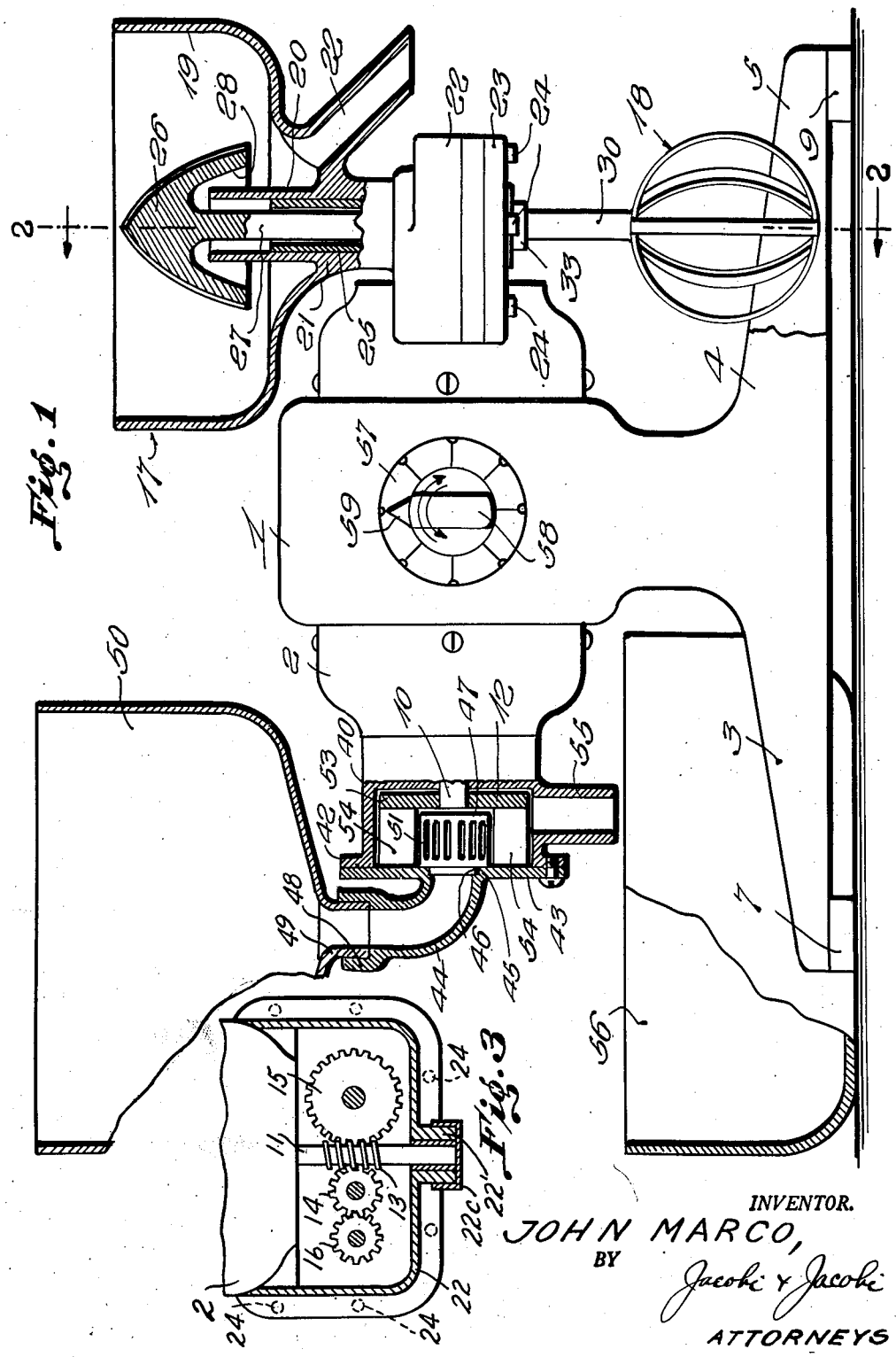
INVENTOR.
JOHN MARCO,
BY
Jacobi & Jacobi
ATTORNEYS

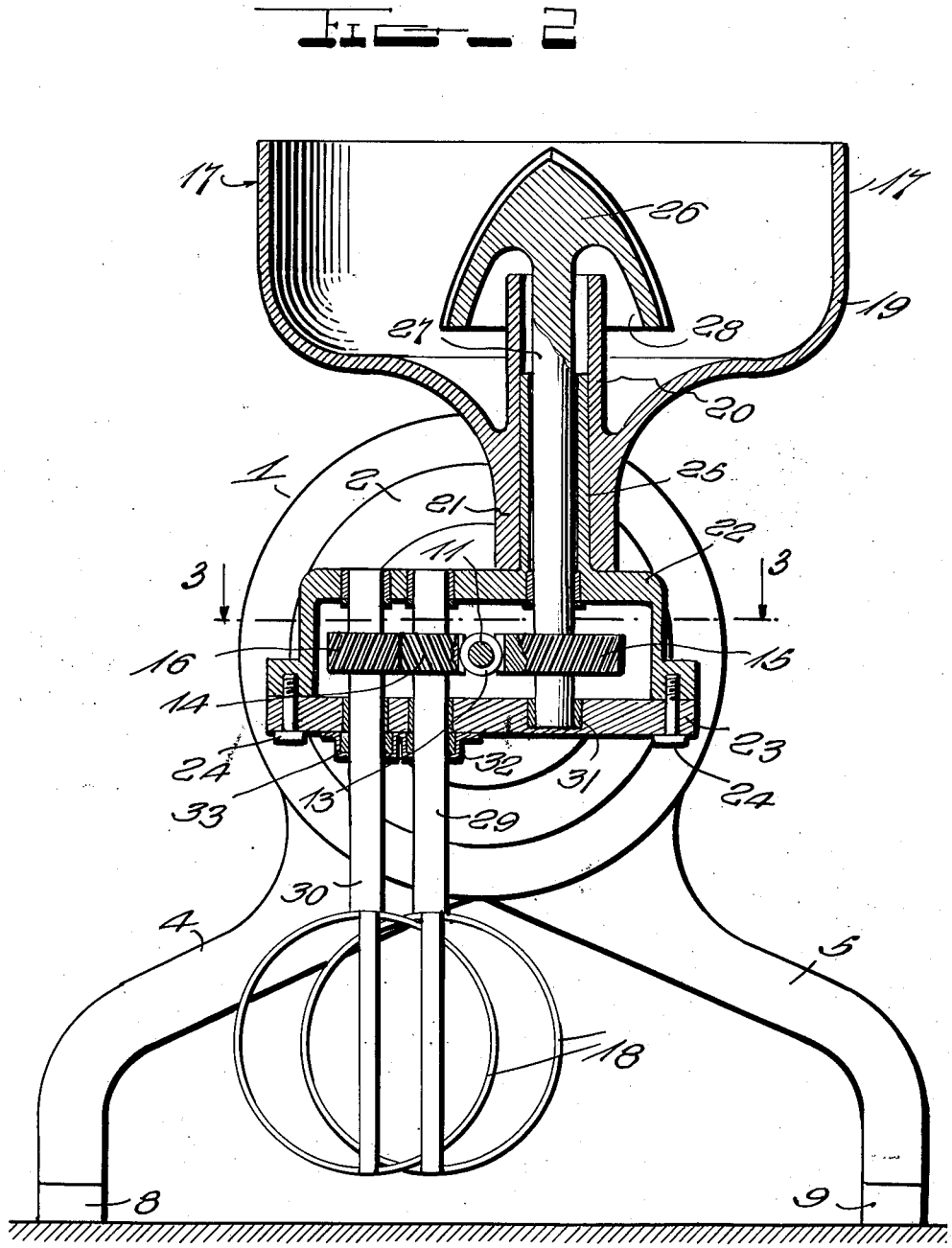

Patented July 29, 1952

2,605,086

UNITED STATES PATENT OFFICE 2,605,086

UNIT EQUIPMENT FOR SUCCESSIVELY TREATING AND REFINING OF FOOD AND ANALOGOUS MATERIALS

John Marco, Wilmington, Del., assignor to Marco Company, Inc., Wilmington, Del., a corporation of Pennsylvania Application September 13, 1946, Serial No. 696,653

2 Claims. (Cl. 259—104)

1

This invention relates to new and useful improvements and the processing of foods, chemicals, medicines and/or pharmaceutical preparations; the primary object being to provide a compact unit combination which may be used in the home, in drug stores, at soda fountains or in the laboratory.

It is an object of my invention to provide a juicer and homogenizer in a single connected unit, to save time in making superior products comprising foods, chemicals or other materials so completely homogenized and mixed as to maintain their intimate colloidal condition until eaten, or during further processing such as baking, cooking, etc.

It is an object of my invention to provide in a food, chemical or other treatment machine or apparatus, comprising a homogenizer capable of breaking up globules of oil and fat so finely that a substantially permanent colloidal mixture for all practical purposes is produced.

It is an object of my invention to provide a household utility or unit machine in which a chef or a kitchen matron can produce superior baked foods resulting from a superior texturization by the superior homogenization of materials treated by my machine. They can even make their own mayonnaise, salad dressings, and all combinations of condiments, to produce reconstruction of dehydrated foods, as well as the preparation of icings, etc. My apparatus is adapted to so minutely divide substantially solid foods within a liquid medium as to provide a predigesting condition thereof for baby and invalid feeding. Since my invention affords a zone having the characteristics of a vacuum in its feed inlet, many canned and pre-cooked products can be readily processed by my apparatus. I have found that a better assimilation is afforded through my homogenization in many food products. In milk, the finer subdivisions of the fat globules is accomplished and the curd formation is made soft and flocculent, and, as a result, it has been found that a better digestive assimilation is provided for the consumer, and a saving of food materials is accomplished by the users of my unique invention.

It is a further object of my invention to provide an apparatus with readily detachable units and parts for the purpose of inspection, cleansing, sterilizing, and replacement of parts, if found to be necessary.

Other objects and advantages of my apparatus will be revealed in the detailed description of my drawings which form a part of my specification.

In the drawings:

2

Figure 1 is a side elevation of my new unit apparatus showing parts thereof in longitudinal vertical section.

Figure 2 is a vertical transverse sectional view of the premixer end of my apparatus, taken substantially on the line 2—2 of Fig. 1 looking in the direction of the arrows.

Figure 3 is a horizontal transverse sectional view on a reduced scale, of the gear mechanism for the premixer taken substantially on the line 3—3 of Figure 2 looking in the direction of the arrows.

The drawings are merely illustrative of my unitary premixer and homogenizer and are not definitive of my invention except as claimed herein.

The reference characters identify the parts and portions of my invention in both the specification and drawings.

In the drawings, the body 1 embraces an electric motor casing 2, preferably in a central zone thereof. The body 1 is provided with laterally extending legs 3, 4, 5, etc., having depending feet 7, 8, 9, etc.

The motor, in its preferred form, is mounted in a horizontal position. The shaft of the motor extends beyond the ends of the motor body and its casing 2 and is supported by them. The motor shaft end 10 is preferably keyed to a homogenizer element 12. The body 1 casing 2 and shaft 10 constitute the sole support for the homogenizer. The opposite end 11, of the motor shaft is provided with a worm 13 in mesh with worm wheels or gears 14 and 15. The worm wheel 14 is in mesh with a gear 16. The worm 13 on the motor shaft operates a combined juicer 17 and a premixer or beater 18. A pan or bowl (not shown) can be placed eccentrically beneath the premixer 18. The pan can be elevated to a position substantially in contact with the premixer to produce a maximum of agitation of the material in the pan. When the pan is raised to a proper position it can be supported in that position by a suitable supporting block (not shown).

The combined juicer and beater combination are likewise supported solely by the body 1, casing 2 and shaft 11.

When it is desired to remove the pan, containing the premix, for the transfer thereof to the homogenizer, then the premixer end of the apparatus is raised sufficiently to release the pan from the beater 18.

The juicer bowl 19 is of special construction in that it is provided with an upstanding hub extension 20 to prevent the escape of the fruit juice through the tubular hub 21. The bowl 19 is also provided with an outlet spout 22 preferably integral therewith to conduct the juices to the agitator pan or to some other suitable receptacle.

The gear mechanism 13, 14, 15, and 16 is located in a gear casing 22 having a removable bottom 23 secured thereto by bolts 24. The upper wall of the casing 22 is provided with an upright tubular extension 25 which is telescopically and axially received by the hub 21 of the bowl 19.

The juicer element 26 is substantially conical, that is, it has the contour of half of a lemon when the lemon is halved transversely of its longitudinal axis. The element is provided with external ribs extending upward and downwardly thereon. The juicer element 26 is provided with a depending shaft 27 connected axially and substantially midway between the top and bottom of the element. The element 26 is further provided with an annular recess 28 defining a skirt to receive a portion of the hub extension 29 as clearly shown in Figure 2.

The casing 22 is secured to the motor casing 2 by a suitable means. The casing 22 and its closure 23 is provided with pairs of aligned upright bearings to rotatively receive respectively the shafts 27, 29, and 30, of the premixer and juicer combination. One tubular bearing is located in a recess 31 located in the closure 23 and the bottom portion of the recess 31 constitutes a thrust bearing for the lower end of the shaft 27.

The gears 14, 15, 16 may be keyed or splined on the shafts 29, 27, and 30 respectively.

The premixer and juicer combination is provided with separable parts. The closure 23 is detachable when the bolts 24 are removed. The removal of the closure 23 carries with itself the gears 14 and 16 including their shafts 29 and 30 respectively.

In order to provide against endwise movement of the shafts 29 and 30 and their gears, suitable collars (not shown) may be provided both above and below both of the gears 14 and 16.

The shafts 29 and 30 are provided with stuffing gland caps 32 and 33 which are preferably secured to the closure 23 by suitable means (not shown).

In connection with Figure 9, it is to be noted that the casing 22 is provided with a bearing support 22' having a bearing supported by the motor shaft end 11. The bearing support 22' is provided with a removable cap 22c secured thereon by any suitable means.

It is the usual practice to transfer the premix material from the combined juicer and premixer to the homogenizer for further refining treatment. The premix material may be designated as a liquid, although it contains many solid particles of food material, since it can be poured and it defines its own top surface level by gravitation and surface tension.

The homogenizer shown comprises a casing 40, having readily detachable connection with an extension 41 of the motor casing 2. The detachable connection is preferably provided with screw threaded portions as clearly shown in Figure 3. The casing 40 is provided with a flanged end 42 upon which a detachable end closure 43 is bolted. The end closure is provided with a tubular elbow 44 preferably integral therewith. One leg of the elbow is coaxial with the closure and is provided with an annular socket 45 to receive an annular flange 46 of an inner homogenizing element 47. The other leg of the elbow 44 extends upwardly and is provided with an annular recess 48 to receive telescopically a tubular outlet 49 from a hopper or bowl 50.

The homogenizer tubular element 47 may be substantially cylindrical in cross section. The circumferential wall of tubular element 47 is slotted longitudinally to provide a treating zone and an exit for the premixed material coming from the hopper 50 through the elbow 44. Substantially one-half of the circumferential wall of the element 47 is cut away to form the slots. It follows therefore that the longitudinal bars 51 defining the slots are collectively substantially equal in area to the total area of all the slots. The element 47 is provided with a closed end 52 which is directly opposite the annular flange 46 of said element. The element is supported and fixed against rotation in the annular socket 45.

The outer homogenizer element 12 is provided with a base 53 which is preferably, removably keyed to motor shaft end 10. The base 53, being fixed on the shaft end 10, is propelled to rotate the same number of revolutions per minute as the shaft end 10. The base 53 is provided with laterally extending blades 54 which are spaced from the axis of the base 53, a distance slightly greater than one-half the diameter of the inner homogenizer 47 and its bars 51. The bars 51 and blades 54 are in such close proximity as to produce a shearing action on the premixed material passing through the slots of the homogenizer 47. The sheared or further refined material is thrown outwardly between the blades 54 by centrifugal force and is carried by the blades to the outlet spout 55 which conveys or guides the refined homogenized material to the receptacle 56. The centrifugal force created by the whirling blades tends to create a low pressure area within the inner element 47 and thereby facilitates and accelerates the movement of the material being treated through the inner element 47. The outer horizontal portions of the blades 54 move in such close proximity to the casing 40 that the inner surface of said casing is maintained substantially free from the permanent setting of material thereon. In this connection, it is also to be noted that the centrifugal action of the blades 54 throws the material being treated against the cylindrical wall of the casing 40 and the whirling blades 54 continue to crush and disintegrate the material along said wall as it is propelled and advanced in its final refining treatment, to the exit 55. This action or treatment, together with the cooperation of the inner and outer homogenizer elements, shear and crush the material into such a state of fineness as to have the quality of a liquid having a colloidal dispersion therein.

The body 1 is provided with a dial 57 cooperating with a control switch handle 58 having a pointer 59 thereon. The control switch (not shown) provides for speed regulation of the motor whereby a suitable speed may be selected to best suit the material being treated.

While the machine shown and described is particularly adapted for home use, it will be understood that the same is equally well adapted for use in the processing of medicines and pharmaceuticals in drug stores, in the processing of materials at soda fountains and also adapted for use in laboratories for processing chemicals and/or other materials.

From the foregoing description of the construction of my improved homogenizer, the method of assemblying and applying same to use may be readily understood, and it will be seen that I have provided a comparatively simple, inexpensive and efficient means for carrying out the various objects of the invention. While I have described the elements best adapted to perform the functions set forth, it is apparent that various changes in form, proportion and in the minor details of construction may be resorted to, without departing from the spirit of or sacrificing any of the principles of the invention.

Having fully disclosed my novel invention, what I claim is:

1. In a unit equipment for treating and refining of foods and analogous materials, said equipment comprising a motor, a motor body and a removable end casing for said body, a motor shaft, a juicer element and juicer bowl, a beater, and a housing, said motor shaft extending from said motor through said end casing and into said housing, said housing having top, bottom and side walls, said bowl having an outlet spout depending therefrom and a combined upright bearing and concentric upstanding collar on said bowl and housing, said juicer element having a shaft extending in depending relation centrally therefrom and extending through said combined collar and bearing and into and through one wall of said housing, said collar being integral with the top wall of said housing, said bottom wall of said housing constituting a removable closure bolted to the side walls of said housing, said juicer element having an annular recess defining a depending concentric skirt extending over and surrounding the upper portion of said collar in concentrically-spaced relation, said housing having three pairs of upright bearings, said beater having upright shafts extending upwardly through two pairs of said bearings, respectively, one bearing of the remaining pair comprises a socket bearing receiving the lower end portion of said juicer element shaft, gears within the housing fixed respectively on all of said shafts, said gears constituting a gear train whereby said motor and motor shaft actuates said juicer element and beater simultaneously.

2. In a unit equipment for treating and refining of foods and analogous materials, said equipment comprising a motor, a motor body and a removable end casing for said body, a motor shaft, a juicer element, a juicer bowl, a beater and a housing, said housing having top, bottom and side walls, said housing extending horizontally from said end casing, said motor shaft extending horizontally through said end casing and into said housing, one side wall of said housing remote from said end casing having a horizontal bearing receiving one end of said motor shaft, said top wall of said housing having an integral sleeve extending integrally and upwardly therefrom and constituting an upright bearing, said bowl having a depending hub and an upright collar within the bowl and extending above said sleeve, said hub and collar being integral with each other and with said bowl, said hub and collar tightly engaging said sleeve, said hub and bowl engaging the top wall of said housing, said bottom wall of said housing constitutes a removable closure, detachably secured to the side walls by bolts, said top and bottom walls collectively having three pairs of upright bearings, said juicer element having a depending shaft extending through said sleeve, one bearing and terminating in a socket-bearing in said closure wall, said beater having upright shafts, extending, respectively, into the other pairs of bearings, gears secured on all of said shafts, respectively, constituting a gear train whereby said motor and motor shaft actuate said juicer element and beater.

JOHN MARCO.

REFERENCES CITED

The following references are of record in the file of this patent:

UNITED STATES PATENTS

| Number | Name | Date |
|---|---|---|
| 1,189,122 | Keller | June 27, 1916 |
| 1,206,716 | Keller et al. | Nov. 28, 1916 |
| 1,228,823 | Robertson | June 5, 1917 |
| 1,483,742 | Nicol | Feb. 12, 1924 |
| 1,630,406 | Prillwitz | May 31, 1927 |
| 1,738,112 | Myers | Dec. 3, 1929 |
| 1,790,257 | Bakewell | Jan. 27, 1931 |
| 1,890,106 | Bendixon | Dec. 6, 1932 |
| 2,054,666 | Van Guilder | Sept. 15, 1936 |
| 2,069,506 | Ross | Feb. 2, 1937 |
| 2,357,640 | Eppenback | Sept. 5, 1944 |